(12) United States Patent
Fransioli et al.

(10) Patent No.: US 6,536,303 B2
(45) Date of Patent: Mar. 25, 2003

(54) STEERING WHEEL

(75) Inventors: Robert Philip Fransioli, Plymouth, MI (US); Chris John Short, Dexter, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,141

(22) Filed: Jul. 26, 2001

(65) Prior Publication Data

US 2003/0019318 A1 Jan. 30, 2003

(51) Int. Cl.$^7$ ............... B62D 1/04; G05G 1/10
(52) U.S. Cl. .......................................... 74/552
(58) Field of Search .............. 74/552, 558; 156/152, 156/153, 257, 267, 278, 293; 29/894.1; D12/176

(56) References Cited

U.S. PATENT DOCUMENTS

| | | | |
|---|---|---|---|
| 3,331,260 A | | 7/1967 | Zeller |
| 3,802,291 A | * | 4/1974 | Young ................. 74/552 |
| 4,201,830 A | | 5/1980 | Wollen |
| 4,448,091 A | | 5/1984 | Bauer et al. |
| 4,581,954 A | * | 4/1986 | Uchida ................. 74/552 |
| 4,584,900 A | | 4/1986 | Masuda |
| 5,356,178 A | | 10/1994 | Numata |
| 5,445,048 A | | 8/1995 | Kaufer et al. |
| 5,476,022 A | | 12/1995 | Koyama et al. |
| 5,761,968 A | | 6/1998 | Poteet |
| 5,819,596 A | | 10/1998 | De Filippo |
| 6,012,354 A | * | 1/2000 | Futschik et al. ........ 74/558 |
| 6,093,908 A | * | 7/2000 | Haag ..................... 219/204 |
| 6,216,556 B1 | * | 4/2001 | Koyama et al. ........ 74/552 |
| 6,273,981 B1 | * | 8/2001 | Mertes et al. ......... 156/152 |
| 6,386,063 B1 | * | 5/2002 | Hayashi et al. ........ 74/552 |
| 2001/0027698 A1 | * | 10/2001 | Fleckenstein ........... 74/552 |

FOREIGN PATENT DOCUMENTS

| | | | | |
|---|---|---|---|---|
| DE | 4039138 C1 | * | 2/1992 | ............ 74/552 |
| DE | 29702241 U1 | * | 5/1997 | ............ 74/552 |
| DE | 29803133 U1 | * | 5/1998 | ............ 74/552 |
| DE | 29813895 U1 | * | 11/1998 | ............ 74/552 |
| JP | 56-112361 | * | 9/1981 | ............ 74/552 |

* cited by examiner

Primary Examiner—Vinh T. Luong
(74) Attorney, Agent, or Firm—Gigette Bejin

(57) ABSTRACT

An energy absorbing steering wheel is provided which reduces a vehicle occupant's injury in a collision. The energy absorbing steering wheel includes an armature, an inner foam member, a first plurality of exterior layers, and optionally a second plurality of exterior layers. The armature is mounted onto a steering column and is operative to provide a rigid steering wheel structure. The inner foam member surrounds the armature and has a first side and a second side. The first plurality of exterior layers is disposed on the first side of the inner foam member. The second plurality of exterior layers disposed on the second side of the inner foam member. The second plurality of exterior layers may be slidably engaged to the first plurality of exterior layers. Moreover, the first and second plurality of exterior layers define a plurality of apertures for disengaging the exterior layers upon impact with a vehicle occupant.

3 Claims, 3 Drawing Sheets

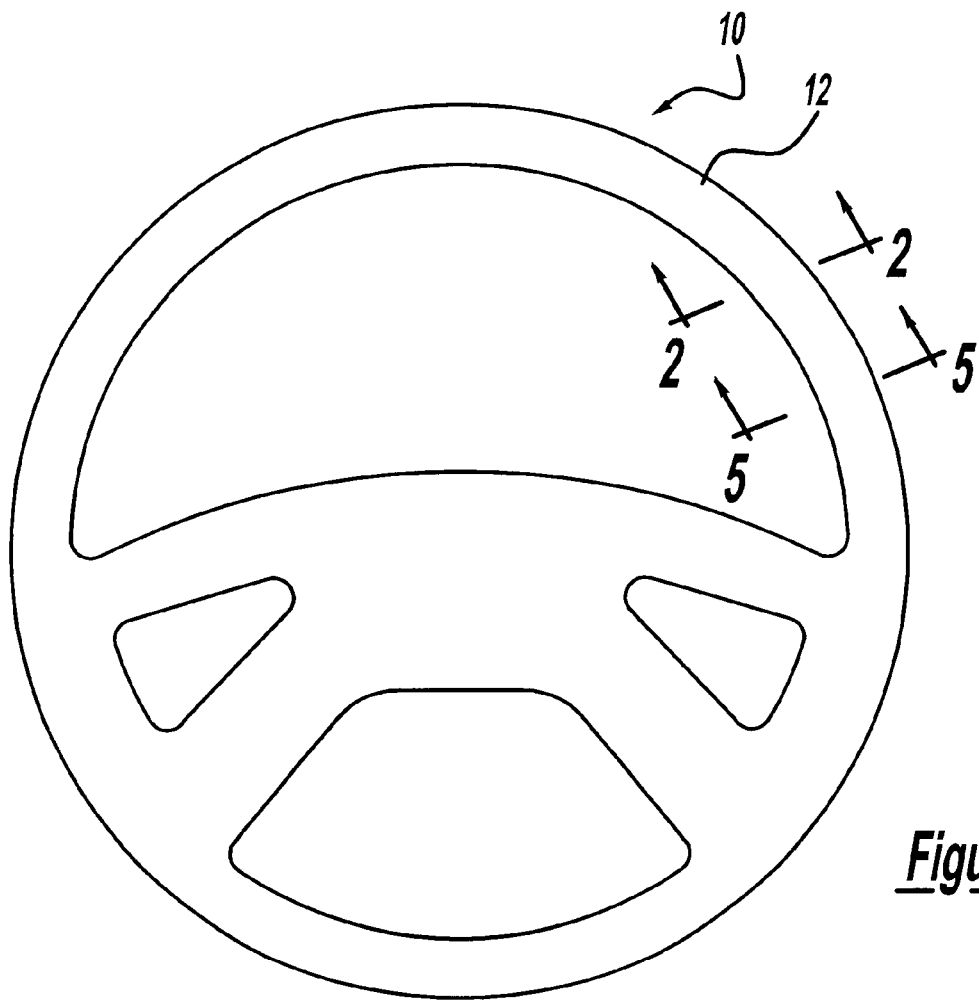
_Figure - 1_
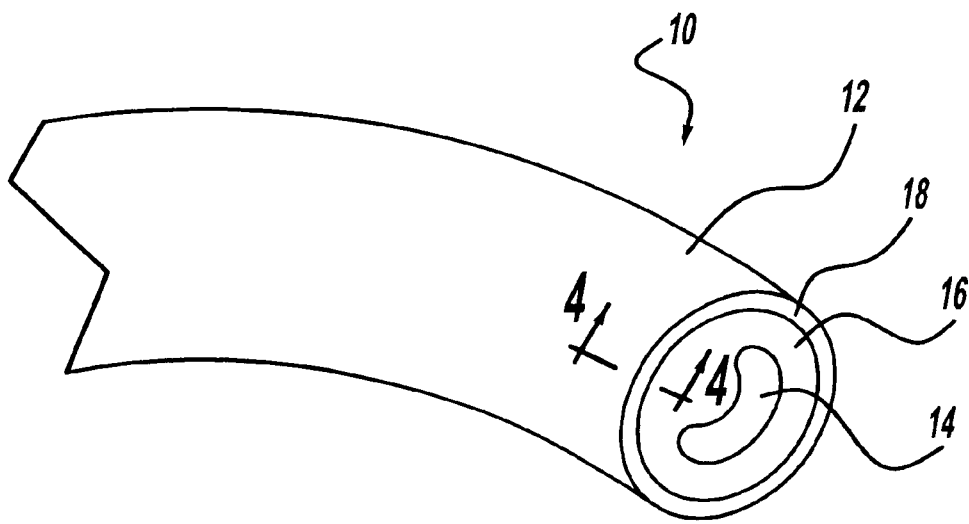
_Figure - 2_

STEERING WHEEL

BACKGROUND OF INVENTION

The present invention generally relates to a steering wheel for reducing occupant injuries in a vehicle collision.

In order to provide additional protection against injury, vehicle manufacturers have designed several interior components for absorbing energy in a collision. These components include but are not limited to interior trim components, seating systems, instrument panels, windshields and steering wheels.

With respect to steering wheels, generally steering wheels are formed of plastic material having an internal member. Traditional steering wheels typically include an exterior cover which surrounds an inner metal member. The exterior cover is made of a somewhat stretchable, flexible, tough skinned and nonabrasive plastic material. However, upon impact with a vehicle occupant, the steering wheel of the prior art is capable of absorbing a limited amount of energy. In order to improve this feature, some prior art steering wheels have steering columns which are able to collapse on impact. Examples of such steering columns are disclosed in U.S. Pat. Nos. 5,820,163; 6,152,488; and 4,627,306. Such structures tend to be both complex and costly.

Another known structure for reducing injury is described in U.S. Pat. No. 3,331,260 issued to Zeller. The steering wheel of the '260 patent is a steering wheel with rings having an exterior layer, a reinforcement ring made of metal, a hard rubber core and one or more superimposed veneer sheets vulcanized to the core. The steering wheel of the '260 patent discloses the wooden veneer being integrally connected to the hard rubber core. The exterior wood layer of the steering wheel is further divided in segments whose veins are at right angles to the periphery of the wheel so that upon impact with a vehicle occupant the wood layers separate at the veins.

However, the steering wheel of the '260 patent and other known plastic/metal steering wheels does not crush upon impact with the vehicle occupant. As noted, the steering wheel of the '260 patent includes wood veneer sheets which are vulcanized to the hard rubber core. Accordingly, the wood veneer sheets of the '260 patent absorb little energy upon impact.

Consequently, a need has developed for an inexpensive steering wheel which absorbs energy upon impact with a vehicle occupant in a collision.

SUMMARY OF INVENTION

The invention addresses the shortcomings of the prior art by providing a steering wheel having a plurality of layers which crushes and absorbs energy under pre-determined loads in a vehicle collision thereby reducing occupant injuries.

Under the invention, the energy absorbing steering wheel preferably includes an armature and an inner foam member surrounding the armature, a first plurality of exterior layers, and optionally a second plurality of exterior layers. The armature is mounted onto a steering column and is operative to provide a rigid steering wheel structure. The inner foam member surrounds the armature and has a first side and a second side. The first plurality of exterior layers is disposed on the inner foam member. Where there is a first plurality of exterior layers and a second plurality of exterior layers, the first plurality of exterior layers is disposed on the first side of the inner foam member and the second plurality of exterior layers is disposed on the second side of the inner foam member. The second plurality of exterior layers and the first plurality of exterior layers may slide with respect to each other when impacted by a vehicle occupant in a collision.

Generally, at least one layer in the first plurality of exterior layers and at least one layer in the second plurality of exterior layers define channels or apertures to allow the layers to crush upon impact with a vehicle occupant. The channels or apertures may have varying cross-sections to allow for greater crush in pre-determined areas of the steering wheel.

The steering wheel layers may, but not necessarily, be made of wood, plastic, fiberglass, or any combination of these materials.

As those skilled in the art will recognize, the embodiments of this invention may vary depending upon the specific requirements of a vehicle. Accordingly, the particular size and shape of the armature, the inner foam member, the first plurality of layers, and the second plurality of layers may vary, depending on the particular application.

These and other objects, features and advantages of the invention are readily apparent from the following detailed description of the best modes for carrying out the invention, when taken in conjunction with the accompanying drawings.

BRIEF DESCRIPTION OF DRAWINGS

FIG. 1 is a front view of the energy absorbing steering wheel.

FIG. 2 is a cross sectional view of a first embodiment of the energy absorbing steering wheel along lines 2—2 of FIG. 1 where the invention includes one set of layered material which surrounds the interior foam member.

DETAILED DESCRIPTION

Figure 3:
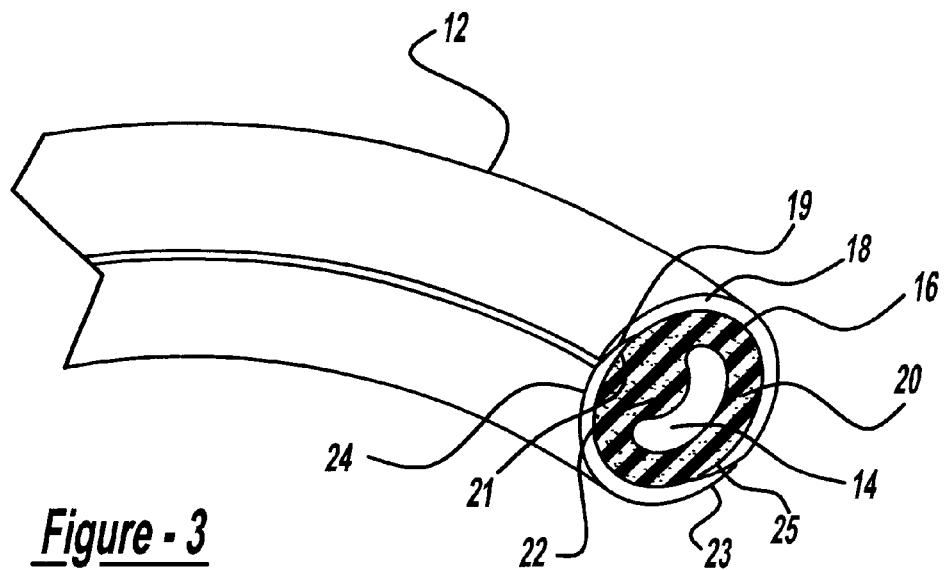
FIG. 3 is an enlarged cross-sectional view of a second embodiment of the energy absorbing steering wheel along lines 2—2 of FIG. 1 where the invention includes a first plurality of layers and a second plurality of layers.

FIG. 1 shows a steering wheel 10 according to the present invention which reduces a vehicle occupant's injury in a collision. The energy absorbing steering wheel 10 includes an outer covering 12 consisting of an armature, an inner foam member 16 (shown in FIGS. 2 and 3) and exterior layers (shown in FIGS. 2, 3, and 4) made of wood, plastic, fiberglass or the like. All of the exterior layers may be made of plastic, wood, fiberglass, or the like, or the exterior layers may be a combination of these materials.

Optionally, the exterior layers may slide with respect to each other in the event of an impact. The exterior layers may but not necessarily be secured to each other with an adhesive.

Referring now to FIG. 2, a cross sectional view of a first embodiment of the steering wheel 10 is shown along lines 2—2 of FIG. 1. As shown, the energy absorbing steering wheel 10 of the present invention includes an armature 14, an inner foam member 16, and a first plurality 18 of exterior layers. The armature 14 is mounted onto a steering column (not shown) and provides structure to the steering wheel 10. As shown, the inner foam member 16 surrounds the armature 14. The inner foam member 16 is preferably made of urethane and is flexible enough so that the inner foam member 16 is able to deform upon impacting a vehicle occupant in a collision.

In a first embodiment of the present invention there is a first plurality of exterior layers 18 which surrounds the foam member 16 and the armature 14. At least one layer in the first plurality of exterior layers 18 defines channels or apertures (shown in FIG. 4) so that the channels or apertures collapse under a pre-determined load when impacted by an occupant in a vehicle collision. A coating such as urethane may also be applied on each layer to further prevent the exterior layers 18 from shattering upon impact. As indicated, the exterior layers 18 may be of varying material such as a first layer of plastic, a second layer of wood, etc. or the layers may be made of a single type of material. The first plurality of exterior layers may be held together with an adhesive. Upon impact, the exterior layers 18 crush and absorb energy from the collision.

Referring now to FIG. 3, the second embodiment of the steering wheel 10 of the present invention is illustrated where the invention further includes a second plurality 24 of exterior layers. In the second embodiment, the inner foam member 16 surrounds the armature 14 and has a first side 20 and a second side 22. The first plurality of exterior layers 18 is disposed on the first side 20 of the inner foam member 16 and the second plurality of exterior layers 24 is disposed on the second side 22 of the inner foam member 16. The first plurality of exterior layers 18 and the second plurality of exterior layers 24 partially overlap each other at their lateral ends 19, 21, 23, 25 to allow the exterior layers 18, 24 to slide relative to each other upon impact. Similar to the first embodiment, the first plurality of exterior layers and the second plurality of exterior layers may, but not necessarily, be secured to the inner foam member and to the surrounding exterior layers with lacquer, adhesive or the like. Upon impact with a vehicle occupant, the exterior layers to slide with respect to each other and to crush in the impact.

Figure 4:
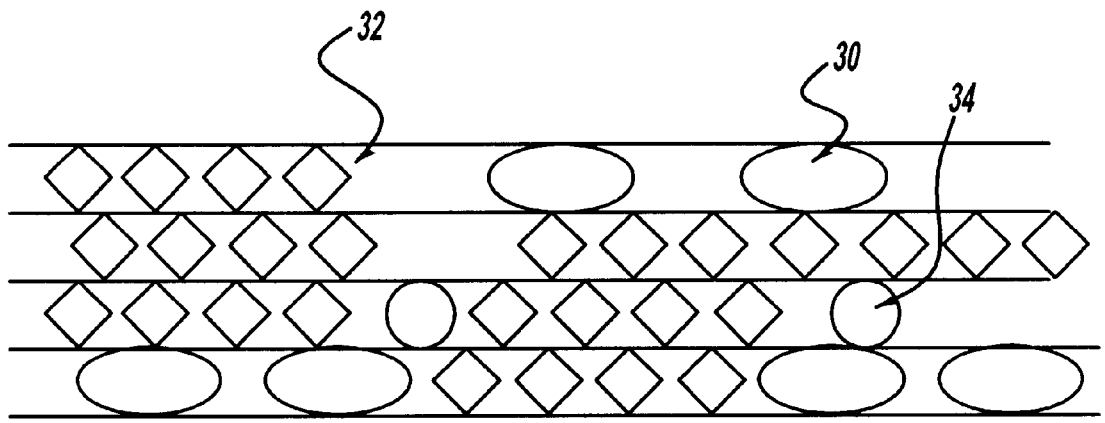
FIG. 4 is an enlarged schematic view of the wood layers of the energy absorbing steering wheel along lines 4—4 of FIG. 2.

Referring now to FIG. 4, an enlarged cross-sectional view of the exterior layers 12 of the steering wheel 10 is illustrated along lines 4—4 of FIG. 2. As shown in FIG. 4, each layer of the first plurality 18 of exterior layers and/or the second plurality of exterior layers 24 define channels having various cross sections so that the channels collapse in an impact and effectively absorb energy upon impact with a vehicle occupant. The channels or apertures 30, 32, 34 may have a cross-section in the shape of a circle, oval, diamond, rectangle, or the like. Furthermore, the shape of the cross-section of the apertures 30, 32, 34 may be dependent upon the location of apertures on the steering wheel. The apertures or channels defined in each layer may or may not be offset from one another. To the extent that more crush is needed in a particular area of the steering wheel, it is preferable to increase the number of apertures or channels in a particular area of the steering wheel.

Upon impact, the apertures 30, 32, 34 in each layer operate as relief sections so that the exterior layers 18, 24 may absorb energy from the collision. Energy absorption is further facilitated as the exterior layers 18, 24 may slide with respect to each other at the lateral ends 19, 21, 23, 25 of the exterior layers 18, 24.

Figure 5A:
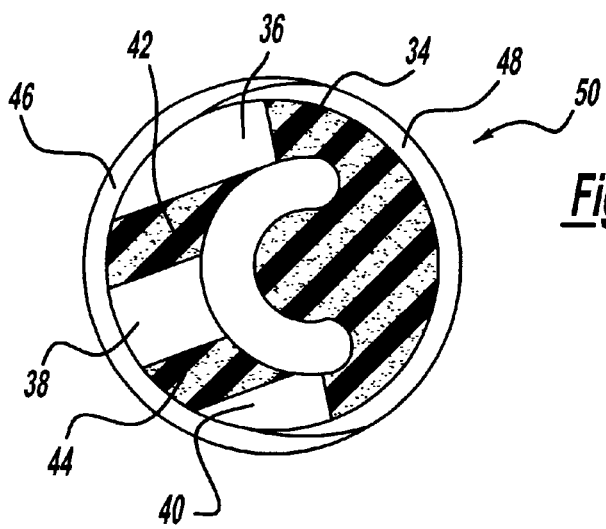
FIGS. 5a–d shows the varying cross sections of steering wheel and the different inner foam members which may be used in the present invention.

FIGS. 5a, 5b, 5c, and 5d illustrate the varying embodiments of the inner foam member. These embodiments may be implemented where there is one or more exterior layers of material on the steering wheel. With reference to FIGS. 5a–5d, the inner foam member defines at least one relief section where the relief section of the inner foam is operative to facilitate the crush of the steering wheel. For example, FIG. 5a illustrates a second embodiment of the inner foam member where the inner foam member 34 has three relief cavities 36, 38, 40. The relief cavities 36, 38, 40 are defined by the inner foam member 34. Between each relief cavity 36, 38, 40 is a wedge 42, 44 to support the outer layer 46 of the steering wheel 50. Upon collision with a vehicle occupant, the exterior layer 46 facing the driver may crush and the wedges 42, 44 collapse thereby absorbing energy in the impact.

Figure 5B:
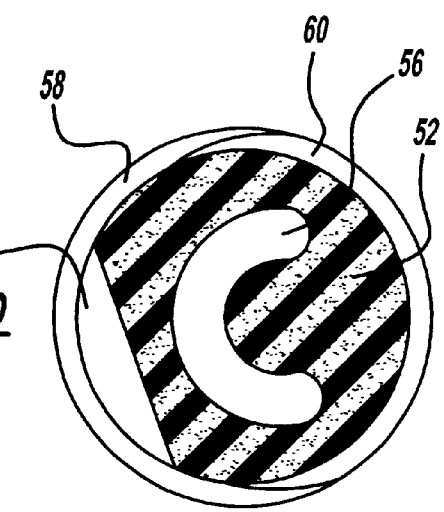

FIG. 5b illustrates a third embodiment of the inner foam member 52 where the inner foam member 52 defines only one relief cavity 54 which will facilitate the crush of the outer layers 58. The inner foam member 52 in this embodiment sufficiently surrounds the armature 56 to support the outer layers 58, 60. Although two exterior sets 58, 60 of layers are shown in this embodiment, greater or fewer sets of layers may be implemented with this type of inner member 52.

Figure 5C:
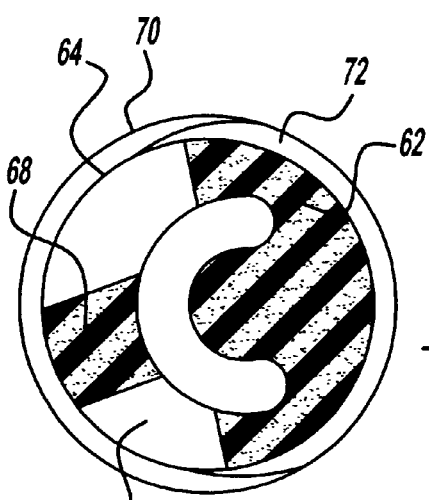

FIG. 5c illustrates a fourth embodiment where the inner foam member 62 defines two relief cavities 64, 66 to facilitate the crushing of exterior layer or layers facing the driver. The inner foam member 62 may further include a wedge 68 which may integral to the inner foam member 62. However, the wedge 68 may also be a separate component which is separately mounted on the armature 70 opposite the inner foam member 62. Similar to the previous embodiments, the wedge 68 is disposed between the relief sections 64, 66. The wedge 68 is also operative to crush and collapse along with the exterior layer or layers 70, 72.

Figure 5D:
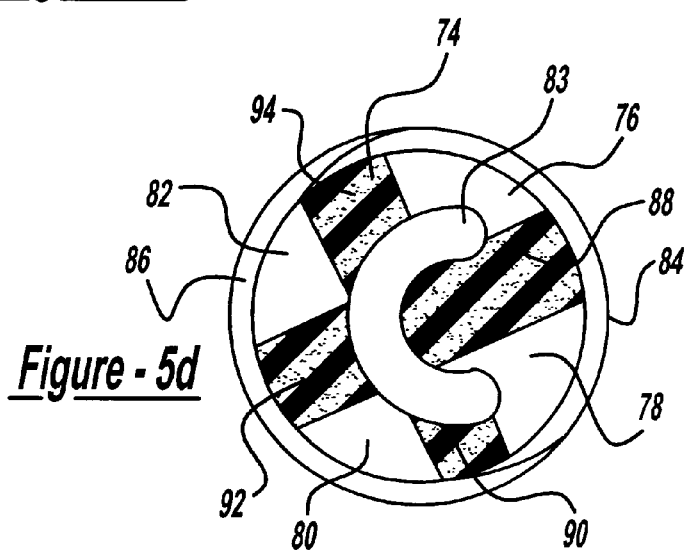

FIG. 5d illustrates a fifth embodiment where the inner foam member 74 provides for improved energy absorption characteristics by defining four relief cavities 76, 78, 80, 82. The four relief cavities 76, 78, 80, 82 exist on four sides of the armature 83 thereby facilitating the crushing and collapsing of the exterior layers in a collision. Similar to the previous embodiments, the inner foam member 74 includes wedges 88, 90, 92, 94 which collapse and crush in an impact.

While the best modes for carrying out the invention have been described in detail, those familiar with the art to which this invention relates will recognize various alternative designs and embodiments for practicing the invention as defined by the following claims. The words used in the specification are words of description rather than limitation, and it is understood that various changes may be made without departing from the spirit and the scope of the invention.

What is claimed is:

1. An energy absorbing steering wheel for reducing a vehicle occupant's injury in a collision, the energy absorbing steering wheel comprising:

an armature;

an inner foam member surrounding the armature and defining at least one relief section; and a first plurality of exterior layers disposed on the inner foam member and defining at least one channel within at least one layer.

2. An energy absorbing steering wheel for reducing a vehicle occupant's injury in a collision, the energy absorbing steering wheel comprising:

an armature;

an inner foam member surrounding the armature and defining at least one relief section, the inner foam member having a first side and a second side;

a first plurality of exterior layers disposed on the first side of the inner foam member and defining at least one channel within at least one layer; and a second plurality of exterior layers disposed on the second side of the inner foam member and defining at least one channel within at least one layer.

3. An energy absorbing steering wheel for reducing a vehicle occupant's injury in a collision, the energy absorbing steering wheel comprising:

an armature;

an inner foam member surrounding the armature, the inner foam member having a first side and a second side; and a first plurality of exterior layers disposed on the first side of the inner foam member, wherein at least one layer in the first plurality of exterior layers defines at least one aperture; and a second plurality of exterior layers disposed on the second side of the inner foam member and being slidably engaged to the first plurality of exterior layers wherein at least one layer in the second plurality of exterior layers defines a plurality of apertures.

* * * * *